United States Patent
Fukuchi (10) Patent No.: US 7,302,875 B2
(45) Date of Patent: Dec. 4, 2007

(54) ROTATION TRANSMITTING DEVICE AND HYDRAULIC DRIVE UNIT

(76) Inventor: Kazuyoshi Fukuchi, 5-22-23, Tagami, Kagoshima-shi, Kagoshima 890-0034 (JP)

( * ) Notice: Subject to any disclaimer, the term of this patent is extended or adjusted under 35 U.S.C. 154(b) by 96 days.

(21) Appl. No.: 10/480,549

(22) PCT Filed: Jun. 13, 2002

(86) PCT No.: PCT/JP02/05934

§ 371 (c)(1),
(2), (4) Date: Jul. 28, 2004

(87) PCT Pub. No.: WO02/103222

PCT Pub. Date: Dec. 27, 2002

(65) Prior Publication Data

US 2004/0244370 A1    Dec. 9, 2004

(30) Foreign Application Priority Data

Jun. 13, 2001  (JP)  ............................ 2001-178052
Jun. 13, 2001  (JP)  ............................ 2001-178053

(51) Int. Cl.
*F16H 1/00*  (2006.01)

(52) U.S. Cl. ...................... 74/655; 74/730.1; 74/572.1; 74/572.2

(58) Field of Classification Search .................. 74/655, 74/730.1, 572.1, 572.2
See application file for complete search history.

(56) References Cited

U.S. PATENT DOCUMENTS

| | | | | |
|---|---|---|---|---|
| 1,892,616 A | * | 12/1932 | Henriod | ...................... 475/173 |
| 1,928,074 A | * | 9/1933 | Renaux | ........................ 188/336 |
| 2,043,529 A | * | 6/1936 | Davis | ............................ 184/6.7 |
| 2,058,545 A | * | 10/1936 | Zingaro | ............................ 475/5 |
| 2,381,593 A | * | 8/1945 | Hobbs | ............................ 477/121 |
| 3,046,883 A | * | 7/1962 | Ranger | ............................ 101/282 |
| 3,509,972 A | * | 5/1970 | Sumiyoshi et al. | ....... 188/77 R |
| 4,346,624 A | * | 8/1982 | Nagasaki et al. | ............ 475/159 |
| 4,531,487 A | * | 7/1985 | Fujikawa et al. | ...... 123/198 DC |
| 5,468,194 A | * | 11/1995 | Hayashi | ........................... 477/3 |
| 5,628,703 A | * | 5/1997 | Roeper | ....................... 475/159 |
| 5,692,989 A | * | 12/1997 | Kamlukin | .................... 475/346 |
| 5,931,735 A | * | 8/1999 | Schierling | ...................... 464/24 |
| 6,119,840 A | * | 9/2000 | Dettmar | ................... 192/70.17 |
| 6,805,648 B1 | * | 10/2004 | Ehrlinger | ........................ 475/5 |

FOREIGN PATENT DOCUMENTS

JP    48-46102    6/1973

(Continued)

*Primary Examiner*—Sherry Estremsky
(74) *Attorney, Agent, or Firm*—Sughrue Mion Pllc.

(57) ABSTRACT

A hydraulic drive device, comprising a hydraulic motor (10), a rotating body (20) connected to the drive shaft (11) of the hydraulic motor (10), functioning, by itself as a flywheel, and having an internal gear (21) formed on the output side thereof, a rotation transmitting device (1) having a gear mechanism for transmitting the rotating force of the rotating body (20) to an output shaft gear (50) by allowing counter gears (30) to mesh with the internal gear (21) and the outer shaft gear (50) to mesh with the counter gears (30), and an output shaft connected to the output shaft gear (50). Whereby, since a variation in rotating speed of the hydraulic motor (10) can be absorbed by the rotation transmitting device (1), the hydraulic motor (10) can be used directly as the drive source of a vehicle such as a car and a truck.

15 Claims, 10 Drawing Sheets

FOREIGN PATENT DOCUMENTS

| | | | |
|---|---|---|---|
| JP | 57-211397 A | 12/1982 | |
| JP | 59-10348 Y2 | 4/1984 | |
| JP | 5-202997 * | 8/1993 | ................ 475/207 |
| JP | 8-48169 A | 2/1996 | |
| JP | 10-82325 A | 3/1998 | |
| JP | 11-165995 A | 6/1999 | |

* cited by examiner

ROTATION TRANSMITTING DEVICE AND HYDRAULIC DRIVE UNIT

TECHNICAL FIELD

The present invention relates to a rotation transmitting device for transmitting rotation driving force generated by a hydraulic motor or the like to a driven side and to a hydraulic drive unit utilizing the rotation transmitting device.

BACKGROUND ART

Hitherto, there has been no technique to directly connect a motor such as hydraulic motor, pneumatic motor, etc. to a generator and drive the generator using the motor as a drive source. This is because the motor such as hydraulic motor or pneumatic motor tends to vary or fluctuate in number of rotations and it is not possible to obtain a stable rotating speed of the motor. Accordingly, there has been a problem in directly connecting an output shaft of the motor to the generator and using the motor as the drive source of the generator.

There has been no technique to use a hydraulic motor as a drive source (engine) of a vehicle such as car or truck, either. Likewise in the foregoing description, this is because the hydraulic motor is easy to vary or fluctuate in number of rotations and it is not possible to obtain a stable rotating speed of the hydraulic motor. Accordingly, there has been a problem in directly using the hydraulic motor as the drive source (engine) of the vehicle such as car or truck.

The present invention was made to solve the above-discussed problems, and has an object of using a compact rotation transmitting device in order to obtain a stable rotation of a motor and directly utilize the motor as a drive source (engine) of a generator or the like even in the case of using the motor such as hydraulic motor, pneumatic motor, etc. easy to vary in number of rotations.

Another object of the invention is to absorb the variation in number of rotations of the hydraulic motor with the use of the rotation transmitting device and directly utilize the hydraulic motor as a drive source of the vehicle such as car or truck.

DISCLOSURE OF INVENTION

A rotation transmitting device according to the present invention is characterized by including: a rotating body that is connected to an input shaft driven by a motor and functions by itself as a flywheel, and on the output side of which an internal gear is formed; and a gear mechanism for transmitting rotating force of the mentioned rotating body to an output shaft formed on an output shaft gear by allowing counter gears to mesh with the mentioned internal gear and the output shaft gear to mesh with these counter gears. Since the rotating body itself functions as a flywheel, even if a motor such as hydraulic motor or pneumatic motor easy to vary in number of rotations is connected to the input side, the variation in rotation of this motor can be absorbed, whereby a stable rotating speed can be obtained (rotating speed stabilizing function). Further, since the internal gear is formed on the output side of the rotating body and the counter gears are allowed to mesh with this internal gear, and the output shaft gear is allowed to mesh with these counter gears, it is possible to freely change rotating speed ratio by changing number of the counter gears or diameter of the counter gears and that of the output shaft gear (rotating speed change function). Furthermore, since the mentioned rotating speed stabilization function and the rotating speed change function can be incorporated in the rotating body, the entire device can be made considerably compact.

Another rotation transmitting device according to the invention is characterized by including: a rotating body that is connected to an input shaft driven by a motor and functions by itself as a flywheel, and on the output side of which an internal gear is formed; and a gear mechanism for transmitting rotating force of the mentioned rotating body to an output shaft formed on an output shaft gear by allowing the output shaft gear to mesh with the mentioned internal gear. Since the rotating body itself functions as a flywheel, even if a motor such as a hydraulic motor or a pneumatic motor easy to vary in number of rotations is connected to the input side, the variation in rotation of the motor can be absorbed, whereby a stable rotating speed can be obtained (rotating speed stabilization function). Further, since the internal gear is formed on the output side of the rotating body and the output shaft gear is allowed to mesh with this internal gear, it is possible to freely change rotating speed ratio by changing diameter of the output shaft gear (rotating speed change function). Furthermore, since the rotating speed stabilization function and the rotating speed change function can be incorporated in the rotating body, the entire device can be made considerably compact.

Further, the invention is characterized by including a mechanism for regulating axial movement of the mentioned rotating body. As a result, there is an advantage of preventing the rotating body from wobbling in axial direction, thus making more stable the rotation of the rotating body.

Further, the invention is characterized by including a brake mechanism that presses a band body provided with rollers or balls on the outer circumference of the mentioned rotating body. As a result, it becomes possible to accurately put a brake on the rotating body.

The invention further provides a hydraulic drive unit in which a hydraulic motor is connected to a hydraulic pump driven by a drive shaft of a vehicle and a drive source is operated by rotating force of this hydraulic motor, the hydraulic drive unit being characterized in that the mentioned rotation transmitting device is connected to between the mentioned hydraulic motor and the mentioned drive source. As a result, it becomes possible to utilize the drive shaft of the vehicle, thereby driving the drive source for generator, power-generating turbine, air compressor, submersible pump, etc.

Another hydraulic drive unit according to the invention is characterized by including: a hydraulic motor; a rotation transmitting device, which has a rotating body that is connected to a drive shaft of the mentioned hydraulic motor and functions by itself as a flywheel, and on the output side of which an internal gear is formed, and a gear mechanism for transmitting rotating force of the mentioned rotating body to an output shaft formed on an output shaft gear by allowing counter gears to mesh with the mentioned internal gear and the output shaft gear to mesh with these counter gears; and an output shaft that is connected to the mentioned output shaft gear. Since the rotating body itself functions as a flywheel, variation in number of rotations of the hydraulic motor can be absorbed and it becomes possible to change to a stable rotating speed (rotating speed stabilization function). Further, as a result of forming the internal gear on the output side of the rotating body, allowing the counter gears to mesh with the mentioned internal gear, and allowing the output shaft gear to mesh with those counter gears, it becomes possible to freely change rotating speed ratio by changing number of the counter gears or diameter of the counter gears and that of the output shaft gear (rotating speed change function). The rotating speed stabilization function and the rotating speed change function can be incorporated in the rotating body and the entire device becomes considerably compact. As a result, it becomes possible to achieve a vehicle drive device using the hydraulic motor as a drive source.

A further hydraulic drive unit according to the invention is characterized by including: a rotation transmitting device, which includes a hydraulic motor, a rotating body that is connected to a drive shaft of the hydraulic motor and functions by itself as a flywheel, and on the output side of which an internal gear is formed, and a gear mechanism for transmitting rotating force of the foregoing rotating body to an output shaft gear by allowing the output shaft gear to mesh with the foregoing internal gear; and an output shaft connected to the mentioned output shaft gear. Since the rotating body itself functions as a flywheel, the variation in number of rotations of the hydraulic motor is absorbed and a stable rotating speed is obtained (rotating speed stabilization function). Further, since the internal gear is formed on the output side of the rotating body and the output shaft gear is allowed to mesh with this internal gear, it is possible to freely change rotating speed ratio by changing diameter of the output shaft gear (rotating speed change function). Furthermore, the rotating speed stabilization function and the rotating speed change function can be incorporated in the rotating body and the entire device can be made considerably compact. As a result, it becomes possible to achieve a vehicle drive device using the hydraulic motor as a drive source.

Further, the invention is characterized by including a mechanism for regulating axial movement of the foregoing rotating body. As a result, there is an advantage of preventing the rotating body from wobbling in axial direction, thus making more stable the rotation of the rotating body.

Further, the invention is characterized by including a brake mechanism that presses a band body provided with rollers or balls on the outer circumference of the mentioned rotating body. As a result, it becomes possible to accurately regulate movement of the rotating body.

Further, the mentioned hydraulic drive unit according to the invention is characterized by including a generator driven by rotation of the mentioned output shaft, a battery charged with power generated by the mentioned generator, an electric motor driven by the power of the mentioned battery, and a hydraulic suction pump that is driven by the mentioned electric motor and sucks hydraulic fluid from a hydraulic fluid tank; and in which the hydraulic fluid sucked by the hydraulic suction pump is introduced into the mentioned hydraulic motor through an actuation switching valve. As a result, it becomes possible to drive a vehicle such as truck without fuel such as gasoline.

Further, the invention is characterized in that plural sets of the mentioned generator and battery are disposed, and so long as a battery of any one set is working, a battery of the other set is charged with power. As a result, it becomes possible to continue operation by the hydraulic motor.

Further, this invention is characterized in that plural sets of the mentioned electric motor and hydraulic suction pump are disposed, and so long as any electric motor and hydraulic suction pump of one set are operating, electric motor and hydraulic suction pump of the other set are caused to stop operation. As a result, it becomes possible to continue operation by the hydraulic motor.

BRIEF DESCRIPTION OF DRAWINGS

FIGS. 3 (a) and (b) are schematic views respectively showing a brake mechanism of the rotating body according to Embodiment 1 of the invention.

BEST MODE FOR CARRYING OUT THE INVENTION

Embodiment 1

Figure 1:
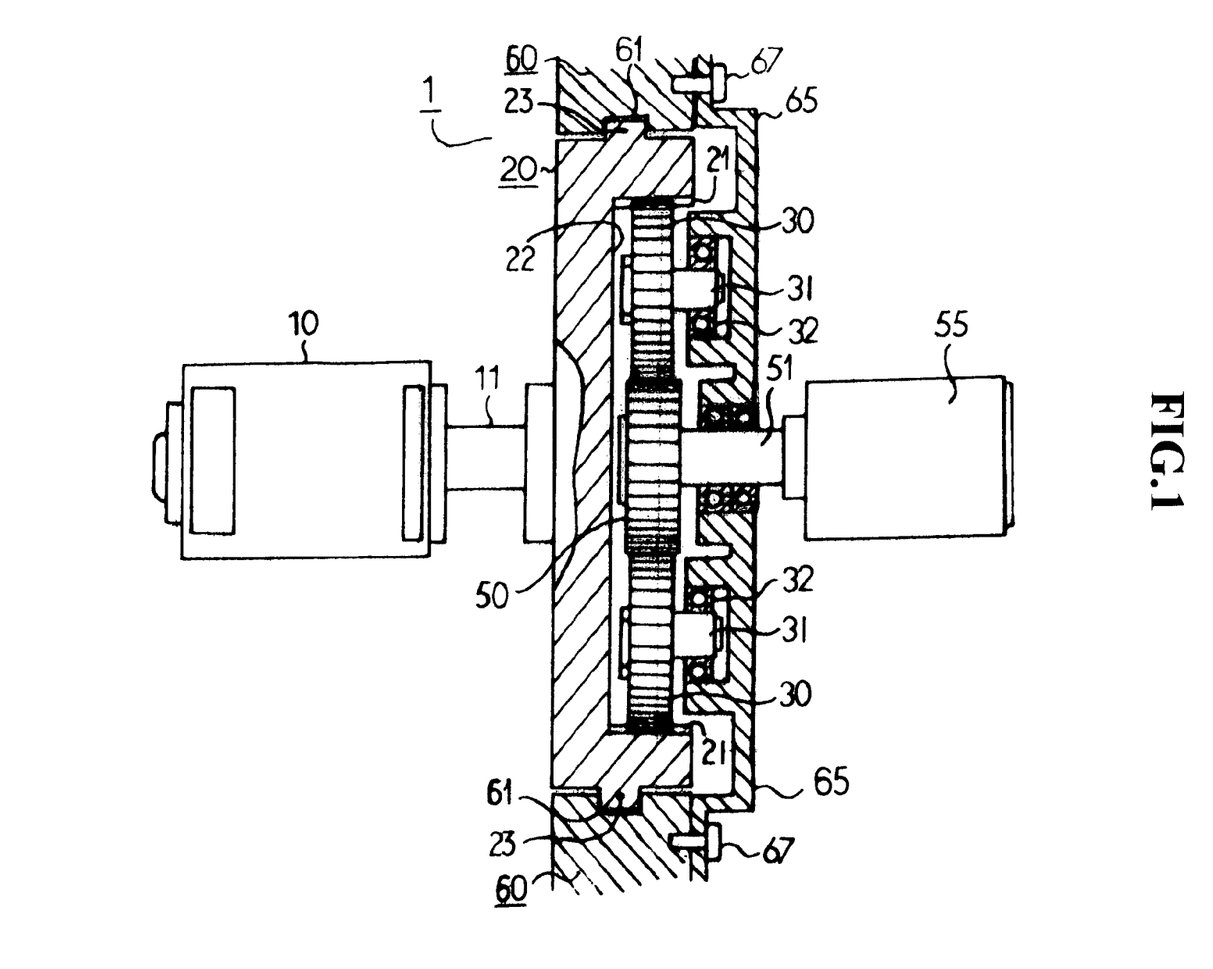
FIG. 1 is a sectional side view showing a rotation transmitting device according to Embodiment 1 of the present invention.

FIG. 1 is a sectional side view showing a rotation transmitting device 1 according to Embodiment 1 of this invention. In this rotation transmitting device 1, rotation driving force of a hydraulic motor 10 is transmitted to a rotating body 20 connected to an input shaft 11. This rotating body 20 is composed of steel and manufactured through, for example, forging or casting, has a predetermined inertial mass W, and performs by itself a function as a flywheel. A recess 22 is provided on the output side of the rotating body 20, and an internal gear 21 is formed on a side wall of the recess 22 through cutting. A protrusion 23 is formed on the outer circumference of the rotating body 20, and this protrusion 23 is regulated by a recess 61 provided on a stationary frame 60.

Figure 2:
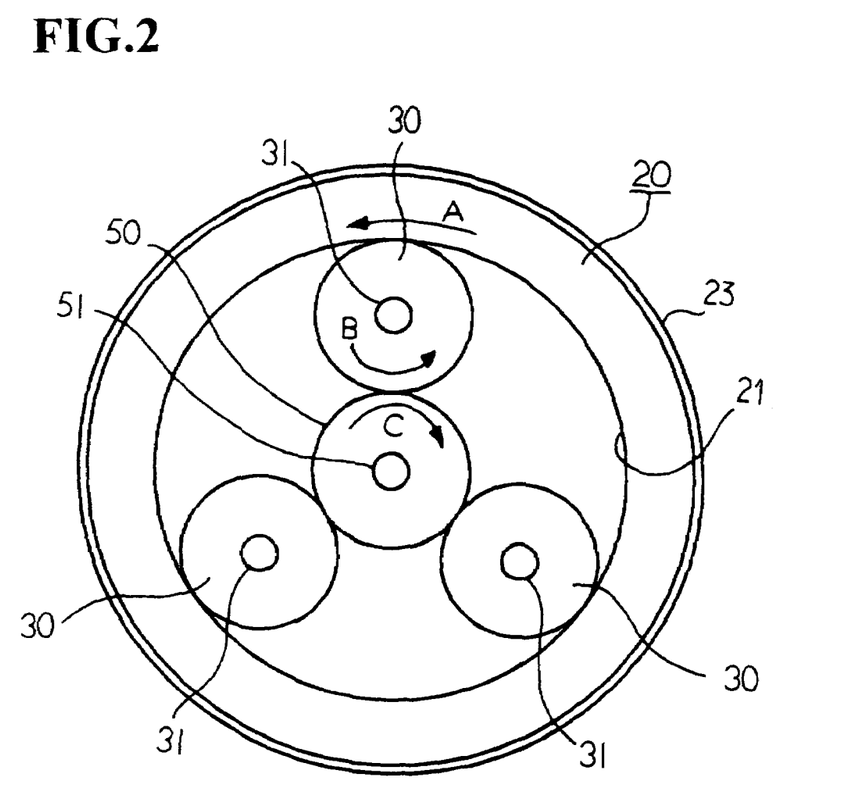
FIG. 2 is a schematic view showing a gear mechanism disposed in an internal gear of a rotating body according to Embodiment 1 of the invention.

FIG. 2 is a view showing a gear mechanism disposed in the internal gear of the mentioned rotating body 20, and is a schematic view taken from the output side showing counter gears 30 meshing with the internal gear 21 and an output shaft gear 50. Three counter gears 30 are in mesh with the internal gear 21 of the mentioned rotating body 20 as planet gears. The three counter gears 30 are disposed at approximately 120 degrees from each other with respect to the center of the rotating body 20. Shafts 31 of the counter gears 30 are rotatably mounted on a fixed plate 65 through bearings 32. The fixed plate 65 is fixed to the stationary frame 60 with bolts 67. The output shaft gear 50 meshing with these counter gears 30 is disposed at the central part among the three counter gears 30. An output shaft 51 integrally formed with the output shaft gear 50 is connected to a generator 55.

Figure 3:
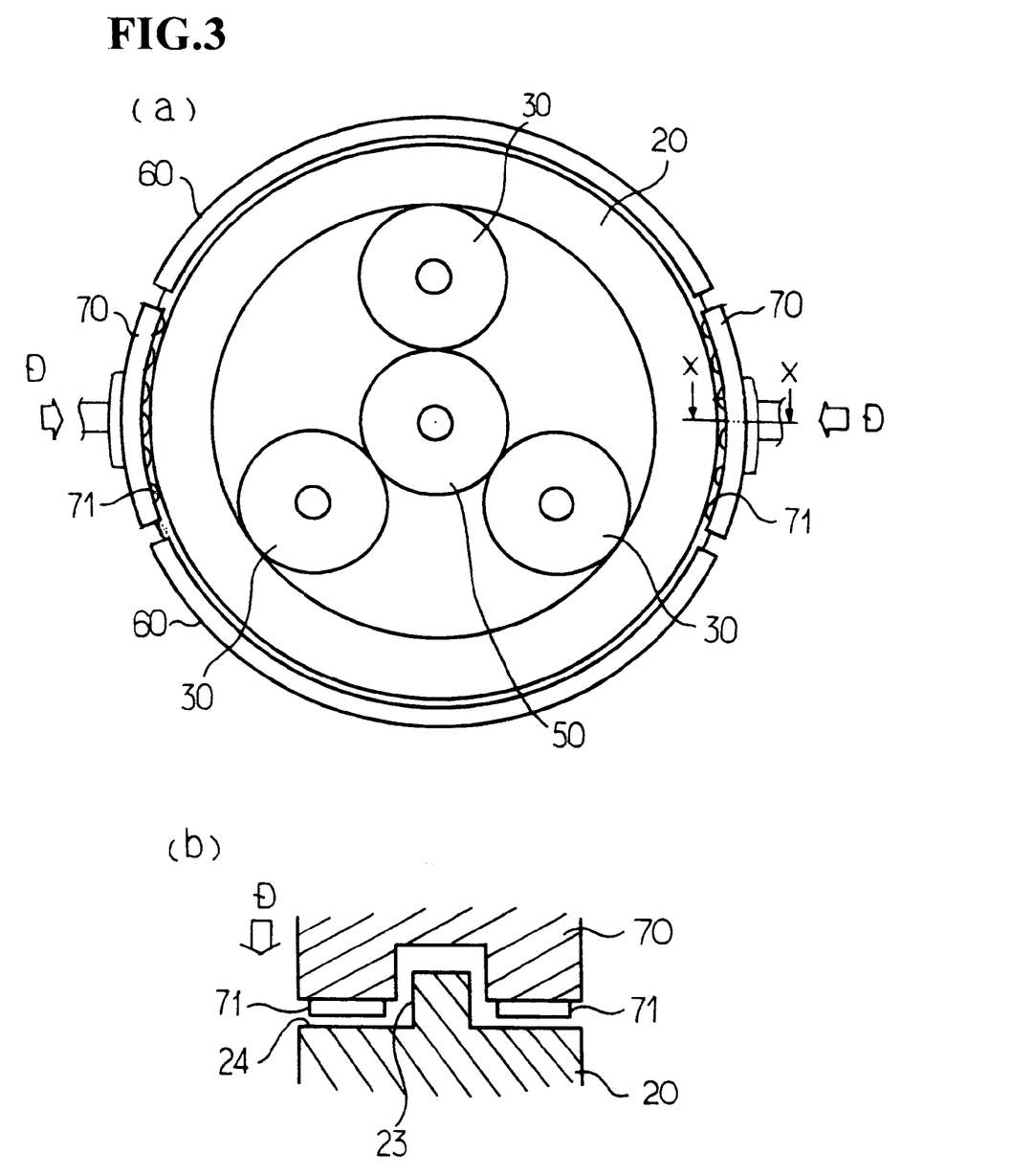

FIG. 3 shows a brake mechanism of the mentioned rotating body 20, and in which FIG. 3(a) is a schematic view taken from the output side, and FIG. 3(b) is a sectional view taken along the line X-X. In the drawings, a band body 70 and steel rollers 71 rotatably mounted on this band body 70 are disposed on the outer circumference of the rotating body 20, thus forming a brake mechanism. A pair of brake mechanisms (each composed of the band body 70 and the rollers 71) is arranged symmetrically about the center of the rotating body 20.

Now, operation of the rotation transmitting device of Embodiment 1 is here in after described. Rotation driving force generated in the hydraulic motor 10 is transmitted to the rotating body 20 through the input shaft 11. The rotating body 20 has a predetermined inertial mass W, absorbs and emits rotational energy produced in the hydraulic motor 10, eliminates variation in rotation as much as possible, and rotates at a stable engine speed. The protrusion 23 on the outer circumference of the rotating body 20 is regulated by the recess 61 on the stationary frame 60 so that the rotating body 20 is prevented from moving in axial direction and rotation of the rotating body 20 becomes more stable.

The rotation of the rotating body 20 (indicated by the arrow A in FIG. 2) is transmitted to the counter gear 30 through the internal gear 21 (indicated by the arrow B in FIG. 2). The rotation is further transmitted to the output shaft gear 50 through the counter gear 30 (indicated by the arrow C in FIG. 2). The rotation of the output shaft gear 50 is transmitted to the generator 55 through the output shaft 51 and drives the generator 55.

As shown in FIG. 3, to brake the rotating body 20, the band bodies 70 are moved toward the center of the rotating body 20 (direction indicated by arrow D). Then the rollers 71 provided on the band bodies 70 are pressed on an outer circumferential face 24 of the rotating body 20, thereby putting a brake on the rotating body 20.

The foregoing Embodiment 1 shows a mechanism in which the three counter gears 30 meshing with the internal gear 21 and the output shaft gear 50 are disposed to act as the gear mechanism disposed in the internal gear 21 of the rotating body 20. The three counter gears 30 are in mesh with the internal gear 21, and the three counter gears 30 are in mesh with the output shaft gear 50.

Figure 4:
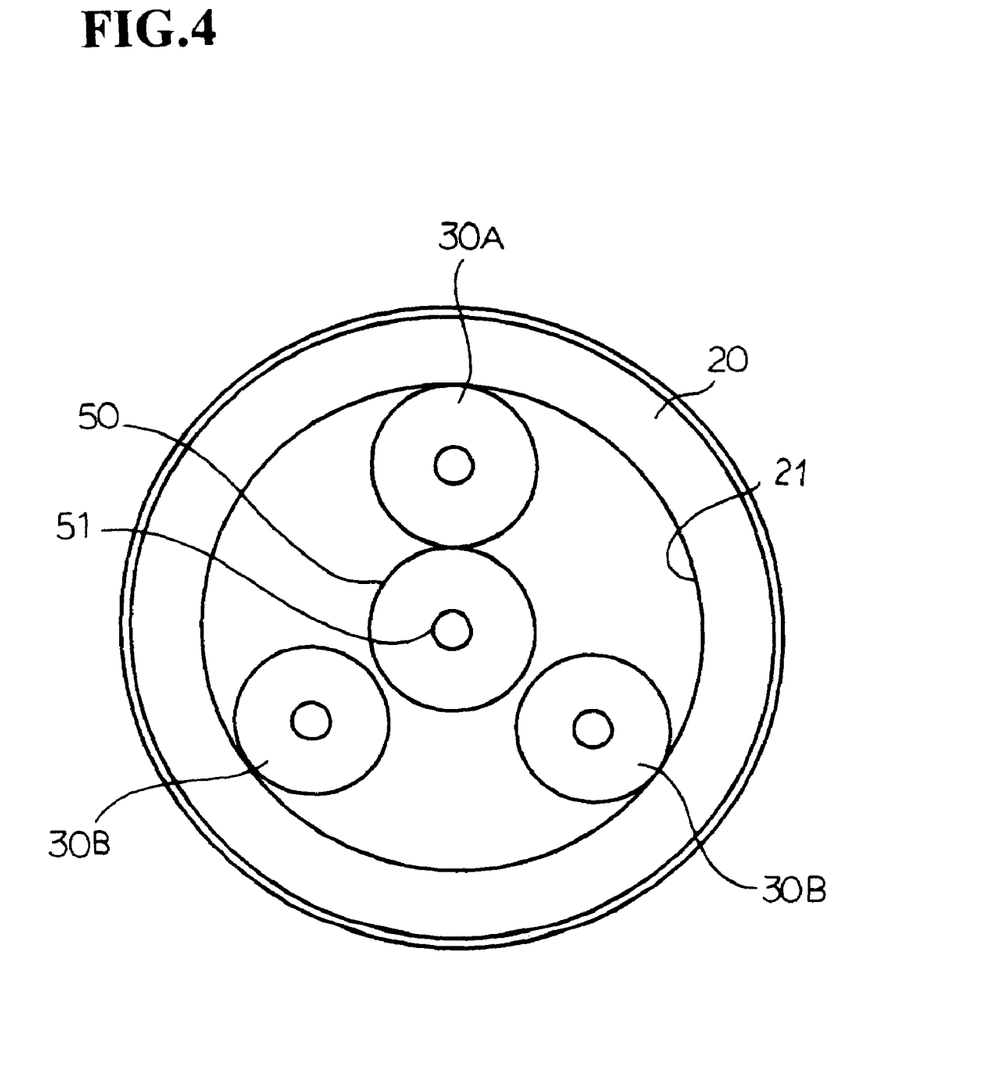
FIG. 4 is a schematic view showing another gear mechanism disposed in an internal gear of a rotating body of this invention.

However, as shown in FIG. 4, it is also preferable that one counter gear 30A is in mesh with the internal gear 21 and the output shaft gear 50, and the rotating force of the rotating body 20 is transmitted to the output shaft 51 through this counter gear 30A. In this case, it is preferable to arrange a structure so that supporting gears 30B being in mesh with the internal gear 21 and not with the output shaft gear 50 are disposed so as to support the rotating body 20 thereby obtaining a stable rotation of the rotating body 20. In addition, the counter gear 30A and the supporting gears 30B are both rotatably mounted on the fixed plate 65 shown in FIG. 1.

Although FIG. 2 shows a structure in which three counter gears 30 meshing with the internal gear 21 are disposed, it is also preferable that number of the counter gears is one or more.

Figure 5:
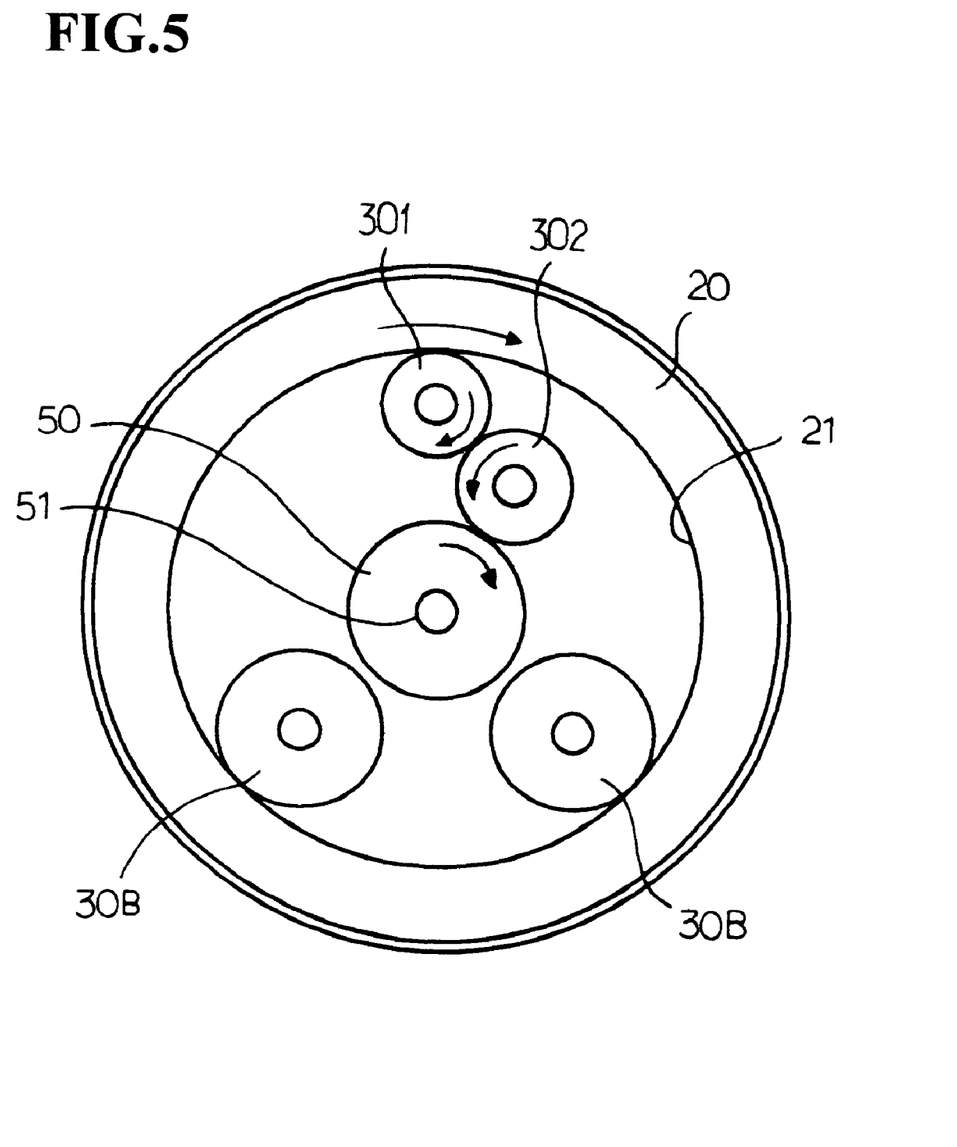
FIG. 5 is a schematic view showing a further gear mechanism arranged in an internal gear of a rotating body of this invention.

Further, the fore going Embodiment 1 shows a mechanism, in which the counter gears 30 meshing with the internal gear 21 and the output shaft gear 50 meshing with the counter gears 30 are disposed, as a gear mechanism arranged in the internal gear 21 of the rotating body 20. However, in this structure, direction of rotation of the rotating body 20 (arrow A) and that of the output shaft gear 50 (arrow C) are different from each other as shown in FIG. 2. To cope with this, FIG. 5 shows an arrangement in which a first counter gear 301 is in mesh with the internal gear 21, a second counter gear 302 is in mesh with the first counter gear 301, and the output shaft gear 50 is in mesh with the second counter gear 302. According to such arrangement, the rotating body 20 and the output shaft 51 rotate in the same direction of rotation.

Figure 6:
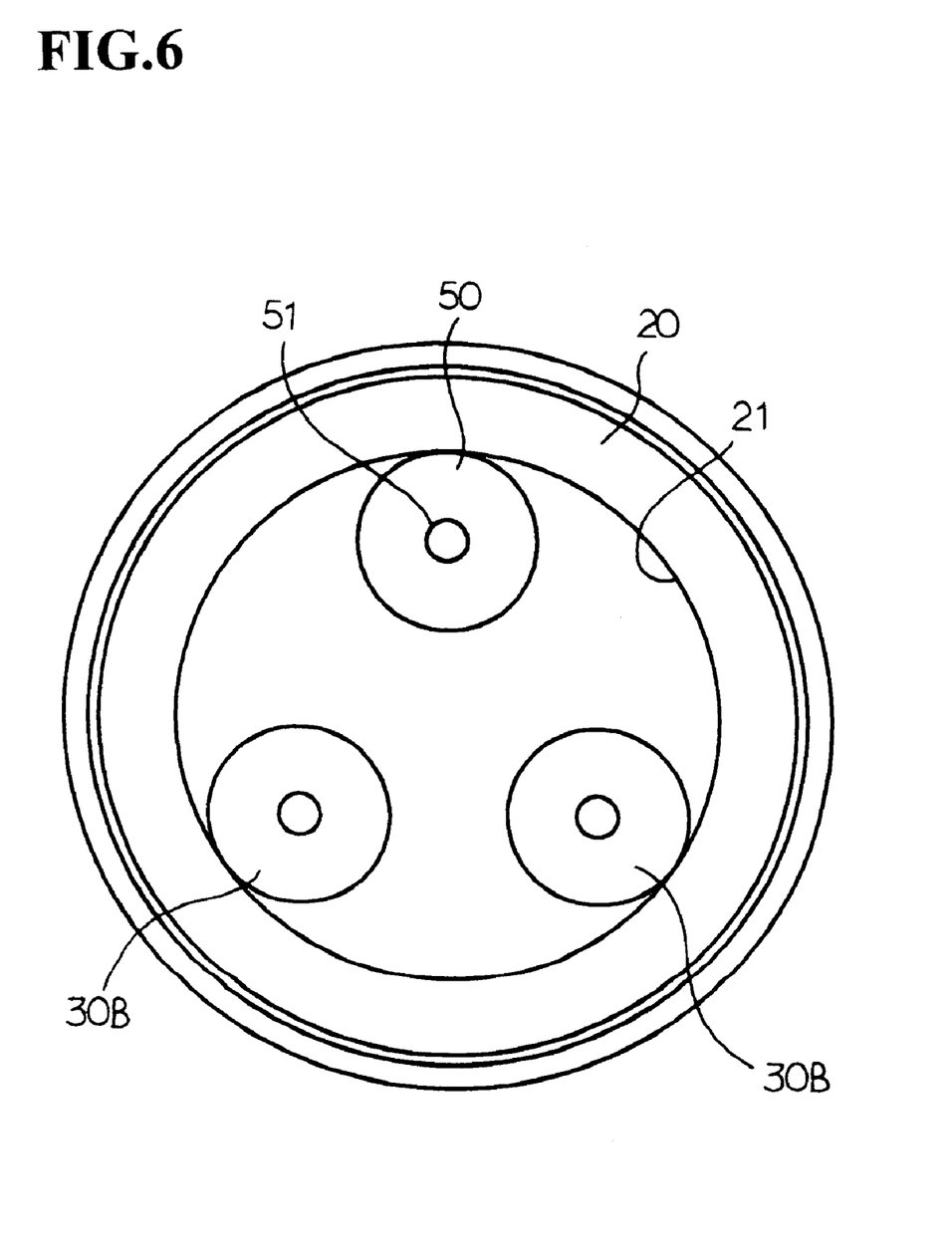
FIG. 6 is a schematic view showing a still further gear mechanism arranged in an internal gear of a rotating body of this invention.

Furthermore, the rotating force of the rotating body 20 is transmitted to the output shaft gear through the counter gears in the foregoing Embodiment 1. It is also preferable that the output shaft gear 50 is disposed to directly mesh with the internal gear 21 of the rotating body 20 so that the rotating force is directly transmitted from the rotating body 20 to the output shaft 51 as shown in FIG. 6.

Further, the foregoing Embodiment 1 shows a structure in which the protrusion 23 is provided on the outer circumference of the rotating body 20 to regulate axial movement of the rotating body 20. This protrusion 23 makes a regulation with the recess 61 of the stationary frame 60 so that the rotating body 20 is prevented from moving in axial direction. It is also preferable that a recess is provided on the outer circumference of the rotating body 20 and this recess is subject to the regulation with a protrusion of the stationary frame.

Furthermore, although the foregoing Embodiment 1 shows a structure comprised of the band body 70 and the rollers 71 to act as a brake mechanism, it is also preferable that the brake mechanism is comprised of a band body and balls rotatably mounted on the band body.

Figure 7:
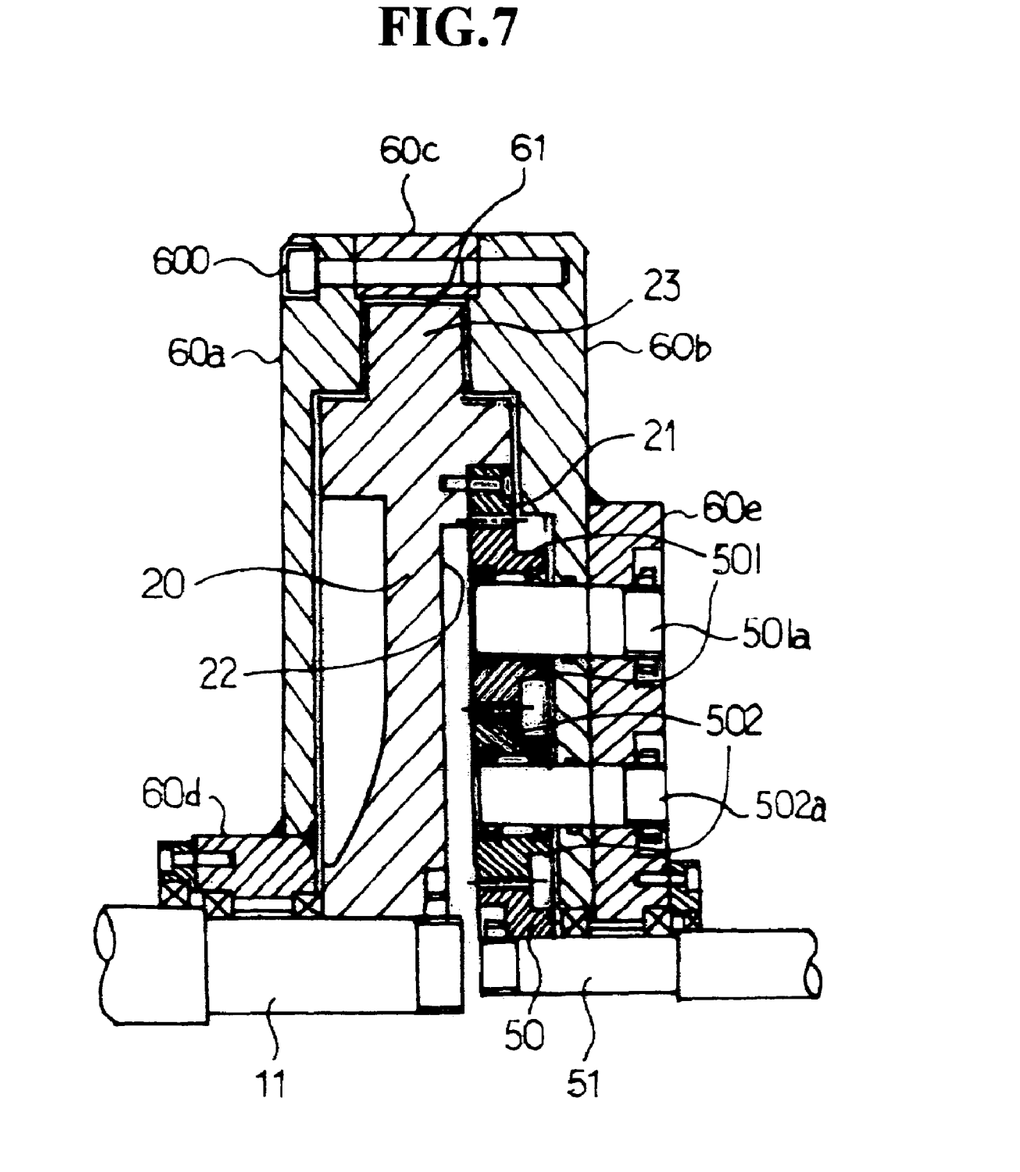
FIG. 7 is a sectional side view showing another rotation transmitting device of the invention.

FIG. 7 is a sectional side view showing one of preferred modes of the foregoing rotation transmitting device 1. In FIG. 7, the rotating body 20 of the rotation transmitting device 1 is surrounded by housings 60a, 60b, and 60c on the stationary side, and the protrusion 23 of the rotating body 20 is regulated by the mentioned housings. In this arrangement, it is possible to increase volume of the protrusion 23, and therefore an inertial weight W of the rotating body is also increased, making it possible to keep a stable rotating force. Further, in FIG. 7, a separately prepared internal gear 21 is mounted on the recess 22 on the output side of the rotating body 20 with a bolt or the like. A first counter gear 501 to be in mesh with this internal gear 21 and a second counter gear 502 to be in mesh with the first counter gear 501 are disposed. The output shaft gear 50 comes to mesh with the second counter gear 502 in this construction. In addition, shafts 501a and 502a of the first and second counter gears 501 and 502 are fixed to a stationary frame 60e, and the first and second counter gears 501 and 502 are rotatably disposed on these shafts 501a and 502a.

Embodiment 2

Figure 8:
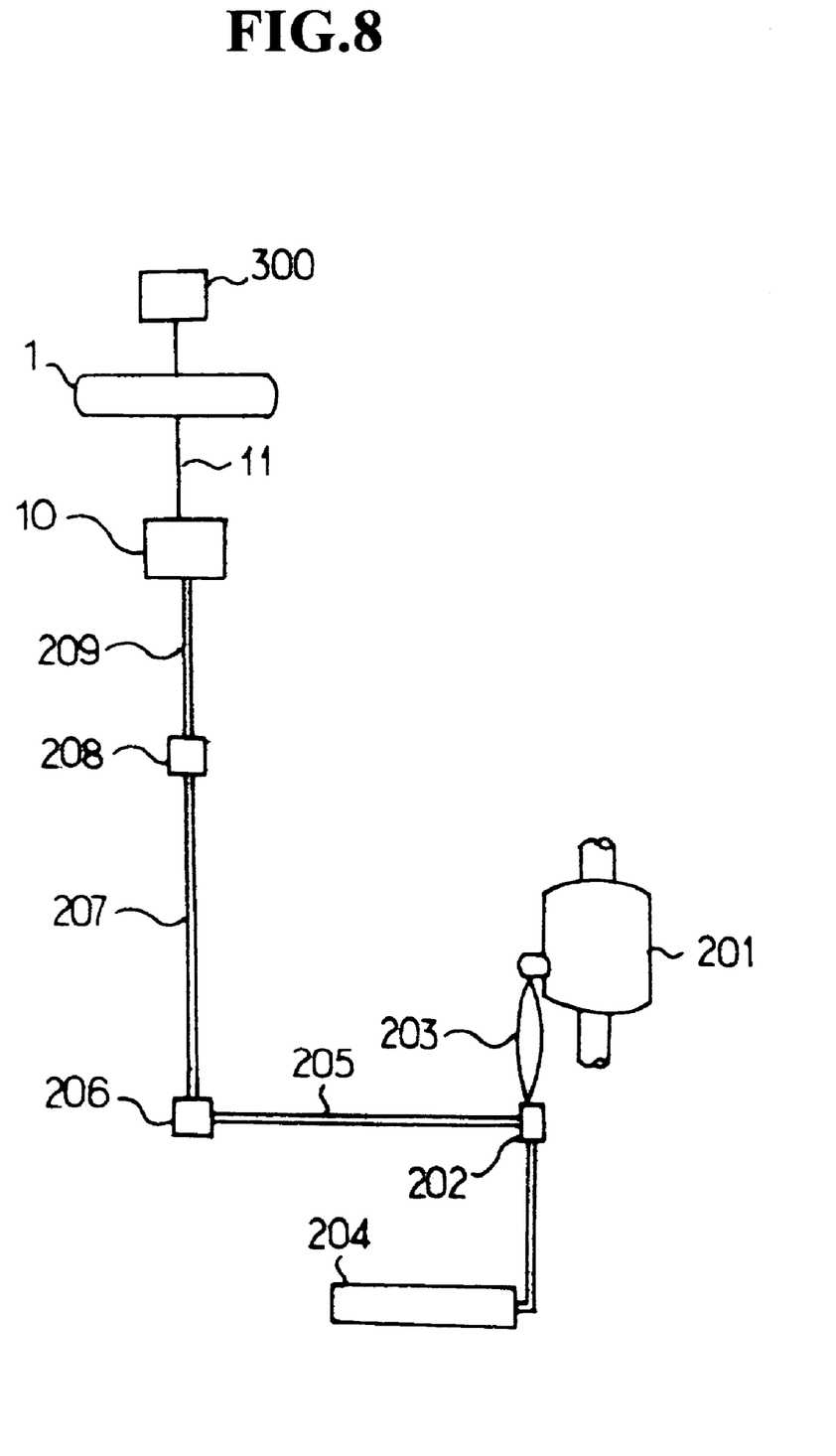
FIG. 8 is a schematic view showing a hydraulic drive unit according to Embodiment 2 of the invention.

FIG. 8 is a schematic view showing a hydraulic drive unit according to Embodiment 2 of the invention.

In the drawing, a drive shaft 203 is mounted on a transmission 201 of a vehicle. The drive shaft 203 drives a hydraulic suction pump 202 so that hydraulic fluid is sucked from a hydraulic fluid tank 204. The sucked hydraulic fluid is introduced into a switching valve 206 through a hose 205. The hydraulic fluid switched by the switching valve 206 is introduced into an actuation valve 208 through a hose 207, and is further introduced from the actuation valve 208 into the hydraulic motor 10 through a hose 209. The rotation driving force of the hydraulic motor 10 is transmitted to a drive source 300 for generator, power-generating turbine, air compressor or a submersible pump through the rotation transmitting device 1 described in the foregoing embodiment.

Embodiment 3

Figure 9:
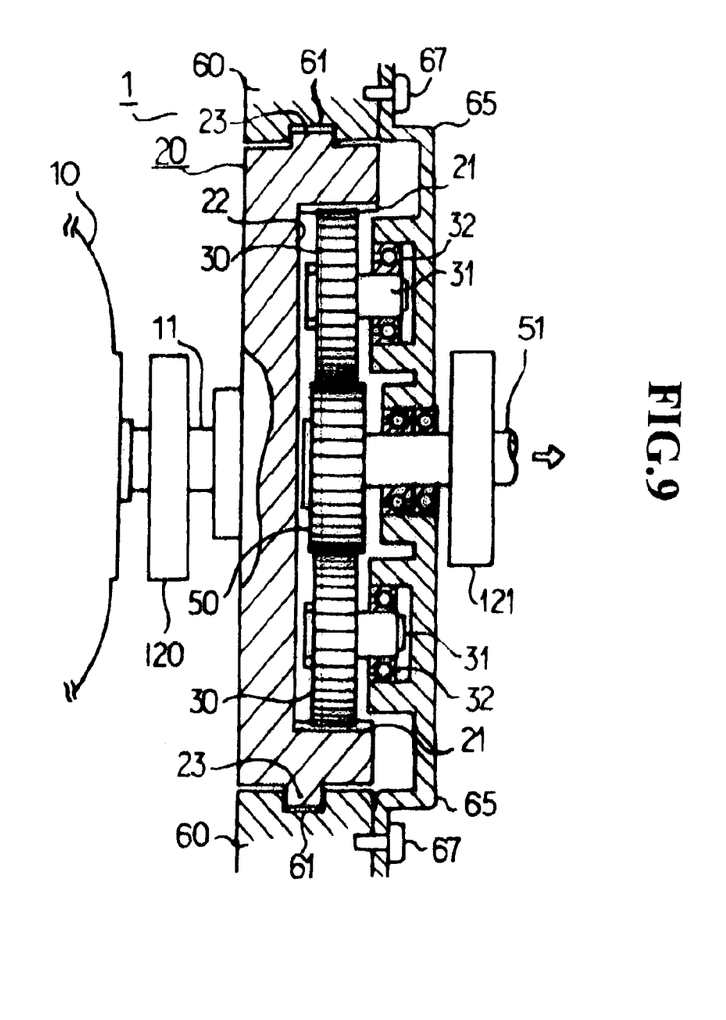
FIG. 9 is a sectional side view showing a hydraulic drive unit for a vehicle according to Embodiment 3 of the invention.

FIG. 9 is a sectional side view showing a hydraulic drive unit for a vehicle according to Embodiment 3 of the invention. The hydraulic drive unit for a vehicle according to this embodiment is comprised of the hydraulic motor 10, the rotation transmitting device 1 described above in the foregoing Embodiment 1, and the output shaft 51. The rotating body 20 of the rotation transmitting device 1 is connected to the drive shaft 11 of the hydraulic motor 10. This rotating body 20 is preferably made of steel, has a predetermined inertial mass W, and functions by itself as a flywheel. The recess 22 is provided on the output side of the rotating body 20, in which the internal gear 21 is formed. The protrusion 23 is provided on the outer circumference of the rotating body 20, and this protrusion 23 is regulated by the recess 61 provided in the frame 60 on the stationary side.

In addition, a shaft-fixing metal piece 120 and a shaft-fixing metal 121 support the drive shaft 11 and the output shaft 51 respectively.

FIG. 2 is a view showing a gear mechanism disposed in the internal gear of the foregoing rotating body 20, and is a schematic view taken from the output side showing the counter gears 30 meshing with the internal gear 21 and the output shaft gear 50. Three counter gears 30 are in mesh with the internal gear 21 of the foregoing rotating body 20 to act as planet gears. The three counter gears 30 are disposed at approximately 120 degrees from each other with respect to the center of the rotating body 20. The shafts 31 of the counter gears 30 are rotatably mounted on the fixed plate 65 through the bearings 32. The fixed plate 65 is fixed to the stationary frame 60 with bolts 67. Further, the output shaft gear 50 meshing with these counter gears 30 is disposed at the central part among the three counter gears 30. The output shaft 51 is connected to the output shaft gear 50.

FIG. 3 is a view showing a brake mechanism of the foregoing rotating body 20, and FIG. 3(a) is a schematic view taken from the output side, and FIG. 3(b) is a sectional view taken along the line X-X. In the drawing, a band body 70 and steel rollers 71 rotatably mounted on this band body 70 are disposed on the outer circumference of the rotating body 20 to act as a brake mechanism. Further, a pair of brake mechanisms (each comprised of the band body 70 and the rollers) is disposed symmetrically about the center of the rotating body 20.

Now, operation of the hydraulic drive unit for a vehicle of Embodiment 3 is hereinafter described. The rotation driving force produced in the hydraulic motor 10 is transmitted to the rotating body 20 through the drive shaft 11. The rotating body 20 has a predetermined inertial mass W, absorbs and emits rotational energy produced in the hydraulic motor 10, eliminates variation in rotation as much as possible, and rotates at a stable engine speed. The protrusion 23 on the outer circumference of the rotating body 20 is regulated by the recess 61 on the stationary frame 60 so that the rotating body 20 is prevented from moving in axial direction and the rotation of the rotating body 20 becomes more stable.

The rotation of the rotating body 20 (indicated by the arrow A in FIG. 2) is transmitted to the counter gear 30 through the internal gear 21 (indicated by the arrow B in FIG. 2). The rotation is further transmitted to the output shaft gear 50 through this counter gear 30 (indicated by the arrow C in FIG. 2). The rotation of the output shaft gear 50 is taken out through the output shaft 51 to act as a drive source of the vehicle.

As shown in FIG. 3, to brake the rotating body 20, the band bodies 70 are moved toward the center of the rotating body 20 (direction indicated by the arrow D). Then the rollers 71 provided on the band bodies 70 are pressed on the outer circumferential face 24 of the rotating body 20, thereby putting a brake on the rotating body 20.

Constitution and operation of the rest of the rotation transmitting device 1 are the same as those explained in the foregoing Embodiment 1, and further explanation thereof are omitted herein.

Embodiment 4

Figure 10:
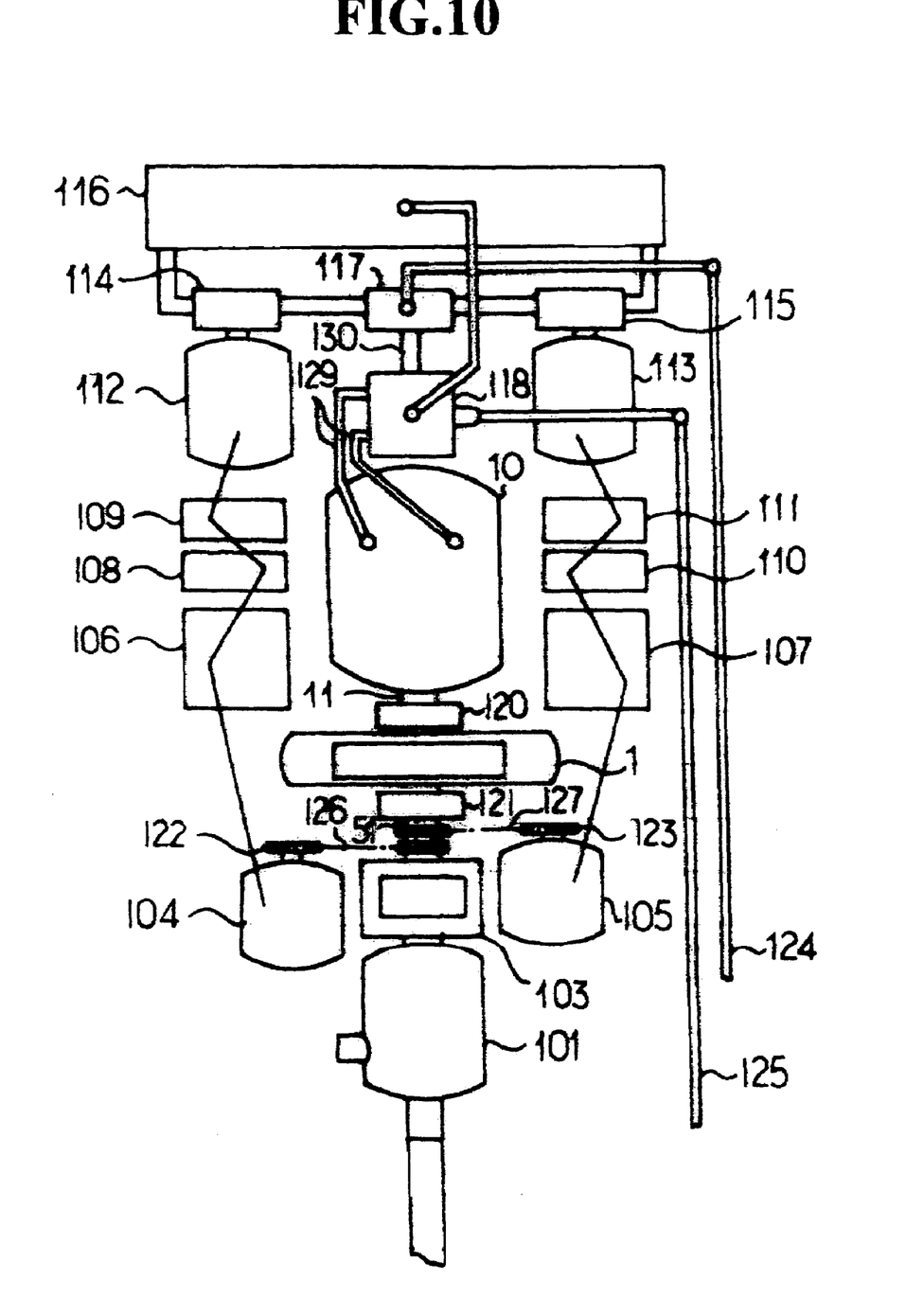
FIG. 10 is a schematic view showing the entire structure of a hydraulic drive unit for a vehicle according to Embodiment 4 of the invention.

FIG. 10 is a schematic view showing the whole of a hydraulic drive unit for a vehicle according to Embodiment 4 of the invention.

In the drawing, the hydraulic motor 10 is disposed as a power source of the vehicle, and the rotation transmitting device 1 described in the foregoing embodiment is connected to the drive shaft 11 of the hydraulic motor 10. The output shaft 51 of the rotation transmitting device 1 is connected to a transmission 101 through a clutch box 103. The rotating force of the output shaft 51 of the rotation transmitting device 1 is transmitted to a first generator 104 through a fan belt 126 and a pulley 122, and is transmitted to a second generator 105 through a fan belt 127 and a pulley 123.

A battery 108 or a battery 109 is charged with electric power generated in the first generator 104 through a charge relay switching box 106. On the other hand, a battery 110 or a battery 111 is charged with electric power generated in the second generator 105 through a charge relay switching box 107.

The electric power given to the mentioned battery 108 or 109 is used to drive an electric motor 112, and the electric power given to the mentioned battery 110 or 111 is used to drive an electric motor 113. The electric motors 112 and 113 are controlled so that when one of the motors is driven, the other motor is caused to stop operation, and the battery on the operation stopping motor side is charged with electric power.

When the electric motor 112 is driven, this motor actuates a hydraulic suction pump 114, and hydraulic fluid is introduced from a hydraulic fluid tank 116 into a hydraulic switching valve 117. On the other hand, when the electric motor 113 is driven, this motor actuates a hydraulic suction pump 115, and hydraulic fluid is introduced from the hydraulic fluid tank 116 into the hydraulic switching valve 117. A switching feed spring 124 is used to switch automatically or manually the hydraulic switching valve 117. When the electric motor 112 is operating, hydraulic fluid from the hydraulic suction pump 114 side is introduced into a suction hose 130, and when the electric motor 113 is operating, hydraulic fluid from the hydraulic suction pump 115 side is introduced into the suction hose 130.

The hydraulic fluid in the suction hose 130 is introduced into a hydraulic actuation switching valve 118. In the hydraulic actuation switching valve 118, the oil pressure is controlled in a multistage manner by operating the operation switching feed spring 125, and is introduced into the hydraulic motor 10 through a hydraulic hose 129.

INDUSTRIAL APPLICABILITY

As described above, the rotation transmitting device according to this invention can stably transmit rotation driving force produced by a hydraulic motor or the like to a device to be driven such as generator. The hydraulic drive unit utilizing this rotation transmitting device can be used to act as a drive source of a vehicle.

What is claimed is:

1. A rotation transmitting device comprising:
   a rotating body that is fixed to an input shaft driven by a motor and functions by itself as a flywheel, and on the output side of which an internal gear is formed; and
   a gear mechanism comprising counter gears for transmitting a rotational force of said rotating body to an output shaft formed on an output shaft gear by allowing said counter gears to mesh with said internal gear and the output shaft gear to mesh with said counter gears,
   wherein a protrusion is formed on either an outer circumference of said rotating body or a stationary frame, and a recess surrounding said protrusion is formed on the other.

2. The rotation transmitting device according to claim 1, wherein said input shaft is fastened to an outside face of said rotating body.

3. A hydraulic drive unit comprising:
   a hydraulic motor connected to a hydraulic pump driven by a drive shaft of a vehicle and a drive source operated by a rotational force of said hydraulic motor,
   a rotation transmitting device connected between said hydraulic motor and said drive source, said rotation transmitting device comprising,
      a rotating body that is fixed to an input shaft driven by said hydraulic motor and functions by itself as a flywheel, and on the output side of which an internal gear is formed; and
      a gear mechanism comprising counter gears for transmitting a rotational force of said rotating body to an output shaft formed on an output shaft gear by allowing said counter gears to mesh with said internal gear and the output shaft gear to mesh with said counter gears.

4. The hydraulic drive unit according to claim 3, wherein said input shaft is fastened to an outside face of said rotating body.

5. The hydraulic drive unit according to claim 3, wherein said input shaft is fixed to said rotating body.

6. A hydraulic drive unit comprising:
   a hydraulic motor;
   a rotation transmitting device including a rotating body that is connected to a drive shaft of said hydraulic motor and functions by itself as a flywheel, and on the output side of which an internal gear is formed; and a gear mechanism comprising counter gears for transmitting a rotational force of said rotating body to an output shaft formed on an output shaft gear by allowing said counter gears to mesh with said internal gear and said output shaft gear to mesh with said counter gears.

7. The hydraulic drive unit according to claim 6, further comprising a mechanism for regulating axial movement of said rotating body.

8. The hydraulic drive unit according to claim 7, further comprising a generator driven by rotation of said output shaft, a battery charged with power generated by said generator, an electric motor driven by the power of said battery, and a hydraulic suction pump that is driven by said electric motor and sucks hydraulic fluid from a hydraulic fluid tank;
   wherein the hydraulic fluid sucked by the hydraulic suction pump is introduced into said hydraulic motor through an actuation switching valve.

9. The hydraulic drive unit according to claim 8, further comprising plural sets of said generator and battery, and so long as a battery of any one set is working, a battery of the other set is charged with power.

10. The hydraulic drive unit according to claim 8, further comprising plural sets of said electric motor and hydraulic suction pump, and so long as any one set of electric motor and hydraulic suction pump are working, an electric motor and hydraulic suction pump of the other set are caused to stop operation.

11. The hydraulic drive unit according to claim 6, further comprising a generator driven by rotation of said output shaft, a battery charged with power generated by said generator, an electric motor driven by the power of said battery, and a hydraulic suction pump that is driven by said electric motor and sucks hydraulic fluid from a hydraulic fluid tank;
   wherein the hydraulic fluid sucked by the hydraulic suction pump is introduced into said hydraulic motor through an actuation switching valve.

12. The hydraulic drive unit according to claim 11, further comprising plural sets of said generator and battery, and so long as a battery of any one set is working, a battery of the other set is charged with power.

13. The hydraulic drive unit according to claim 11, further comprising plural sets of said electric motor and hydraulic suction pump, and so long as any one set of electric motor and hydraulic suction pump are working, an electric motor and hydraulic suction pump of the other set are caused to stop operation.

14. The hydraulic drive unit according to claim 6, wherein said drive shaft is fastened to an outside face said rotating body.

15. The hydraulic drive unit according to claim 6, wherein said drive shaft is fixed to said rotating body.

* * * * *